W. S. WILLS.
VEHICLE TRUCK OR RUNNING GEAR.
APPLICATION FILED JULY 6, 1908.
946,479.
Patented Jan. 11, 1910.
2 SHEETS—SHEET 2.
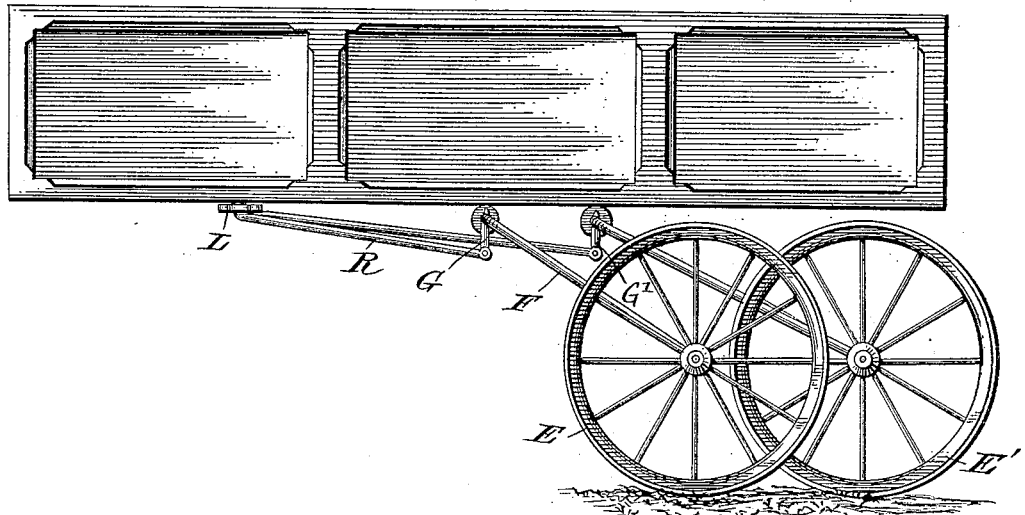
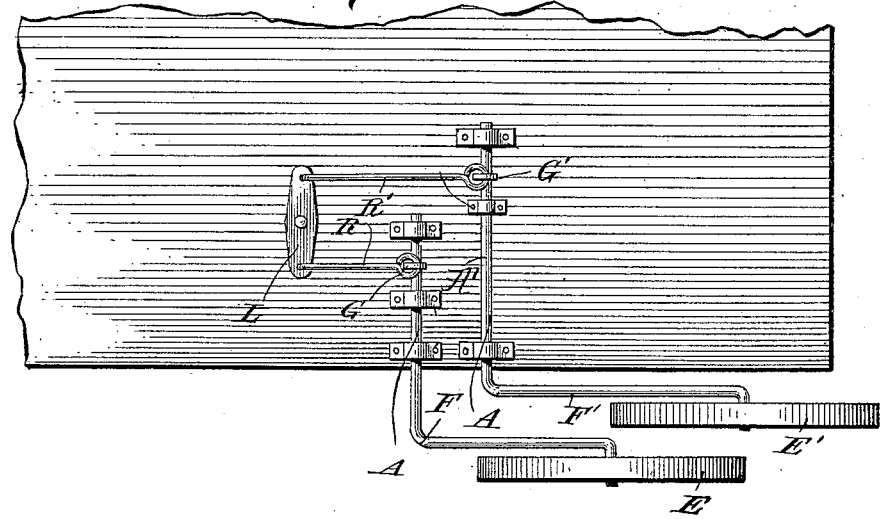
Witnesses:
Harry P. Van Lear.
P. L. Burgess
Inventor:
William S. Wills.

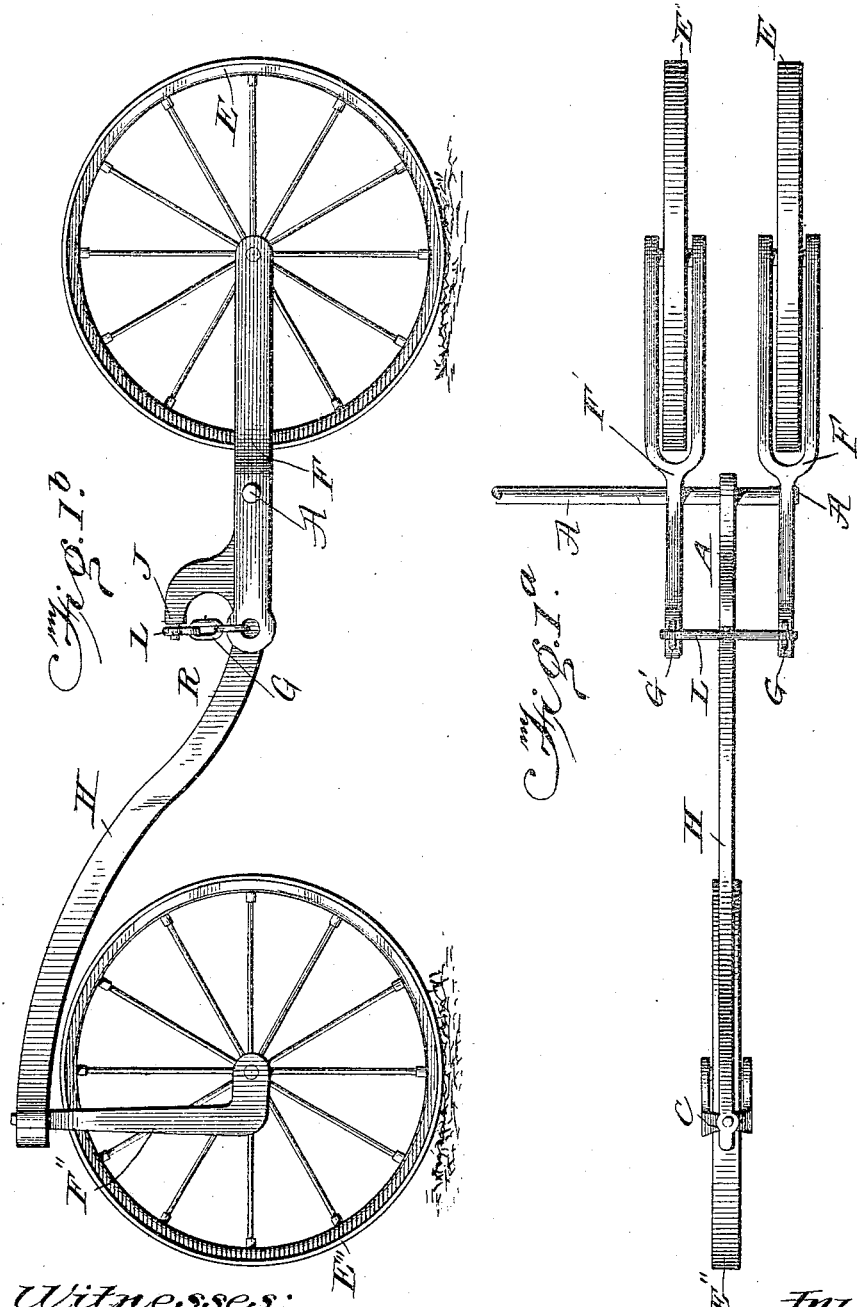

UNITED STATES PATENT OFFICE.

WILLIAM S. WILLS, OF COVINGTON, VIRGINIA.

VEHICLE-TRUCK OR RUNNING-GEAR.

946,479.

Specification of Letters Patent. Patented Jan. 11, 1910.

Application filed July 6, 1908. Serial No. 442,234.

*To all whom it may concern:*

Be it known that I, WILLIAM S. WILLS, a citizen of the United States, residing at Covington, Alleghany county, State of Virginia, have invented an Improvement in Vehicle-Trucks or Running-Gears, of which the following is a specification.

The object of my invention is to provide an improvement in trucks or running-gear, whereby I reduce and distribute the jar or shock incident to contact of the wheels with obstacles in the road-way, and whereby the vehicle bed or frame to which the truck proper is attached will not be lifted as much as that one of the wheels which may pass over an obstruction. Thus in a vehicle provided with my truck attachment, springs may be dispensed with.

The details of construction, arrangement, and combination of parts are hereinafter described, and illustrated in the accompanying drawings, in which—

Figure 1$^a$ is a plan view; and Fig. 1$^b$ a side view of a truck or running-gear embodying one form of my invention. Figs. 2$^c$ and 2$^d$ are, respectively, a side and bottom plan view of another form of my invention which is connected directly with a vehicle body.

I will first describe the form shown in Figs. 1$^a$ and 1$^b$. In this form, three wheels are employed, the same being indicated by E, E', and E'', the former two being arranged in the rear and side by side. The rear wheels E, E', are journaled in the forks of levers F, F', which are in turn journaled on a horizontal axle, or shaft, A, the latter serving in practice as a substitute for the rear axle of a vehicle. The free ends or shanks of the levers F, F', which are extended forward of the shaft A, are connected by means comprising a rocking lever L and chains G, G'. The lever is arranged horizontally and journaled upon a pin forming a forward projection of a curved vertical arm, or bracket, J, formed on the long lever H that connects the bearing of the front wheel E'' with the shaft A. The wheel E'' is journaled in the fork F'' which is pivoted in said lever.

It will be understood that the form of truck described, is, in practice, duplicated on the opposite side of a vehicle body of which it may form an attachment and support. It is obvious that the levers F, F', may oscillate independently in a vertical plane by reason of the lever connection between their front ends, and that the wheel E'' may also oscillate vertically independently of the wheels E, E'. In other words, the several levers have a common center of oscillation, which is the shaft or axle A, and about this center they may oscillate freely in vertical planes as they pass over obstacles or one is raised higher than another in consequence of the unevenness or roughness of the roadway.

To state the operation more particularly, when one of the wheels, say E, meets an obstacle, it rises, and in so doing, the front end of its fork will obviously be depressed and thus the adjacent end of the lever L will be drawn down and the opposite end of the same carried up correspondingly, so that the result will be that the wheel E' will be carried or forced down with respect to the truck practically to the same degree that the wheel E rises. It will be further seen, that, in consequence of the connection of the three wheels with the axle A, one-third of the weight will be imposed on the front wheel and one-third on each of the rear wheels, and thus the lift being only one-third, the jolt transmitted to the vehicle body by any one wheel will be only one-third, and hence the conveyance or vehicle provided with trucks of this description will be freer from shock and more comfortable for riding than trucks or running gear of the ordinary construction.

In the form of my figures shown in 2$^c$, 2$^d$, I employ two wheels, E, E', on each side of the vehicle body, and these are mounted on separate right angular levers F, F'. As shown in Fig. 2$^d$, the levers are bent twice at a right angle and thus constitute double cranks. Their horizontal portions A are journaled in brackets or keepers secured to the under side of the vehicle, and arranged parallel, one in front of the other. One of the wheels E is thus placed exterior to the other, but still parallel thereto. Each of the rock shafts or axles A has a pendent lever arm, one indicated by G, and the other by G'. These respective arms are connected by rods R and R' with a rocking lever L, which is arranged horizontally and pivoted centrally to the under side of the vehicle body. It is apparent that, from this construction and arrangement of parts, practically the same result will be attained as in the case first described. That is to say, when one of the wheels strikes an obstruction and rises over it, the other one will move downward with reference to the body of the truck, and will run forward on smooth ground thus lifting one side of the conveyance while the first wheel passes over the obstacle. In such case, the lift or rise of the vehicle body will be but one-half the height of the obstacle.

To state the operation more particularly; suppose the wheel E meets an obstruction and rises in passing over it, it is apparent that the pendent lever arm G of the rocking axle A will then be moved to the rear, or inclined rearward, and thus by traction of the rod R, the adjacent end of the lever L will be drawn rearward and the other end moved correspondingly forward, so that the lever arm G′ of the adjacent rocking axle will be drawn forward, thus depressing the wheel E′.

What I claim is:

1. In a vehicle truck, the combination of running wheels and levers on which they are mounted, the said levers being journaled and adapted to oscillate vertically, and lever mechanism connecting the front end of said levers whereby the latter are adapted to oscillate reciprocally when one wheel is raised higher than the other, substantially as described.

2. In a vehicle truck, the combination of running wheels, separate levers on which they are journaled, the same being spaced apart and journaled to oscillate in vertical planes, and means for connecting extensions of said levers, which comprise a pivoted rocking lever and devices connecting its ends with the extensions of the first-named levers, as shown and described.

3. In a vehicle truck of the type indicated, the combination of a supporting horizontal shaft, levers fulcrumed thereon, one projecting in front and two in rear of the same, wheels journaled at the extremities of said levers, and means connecting the rear levers with the front lever so that the weight resting on the shaft of the truck will be distributed to the several wheels, as described.

WILLIAM S. WILLS.

Witnesses:
HARRY P. VAN LEAR,
R. L. BURGESS.